(12) United States Patent
Yamashita et al.

(10) Patent No.: US 8,502,703 B2
(45) Date of Patent: Aug. 6, 2013

(54) SYSTEM AND METHOD FOR ASSISTING WITH SAFE DRIVING, COMPUTER PROGRAM FOR ASSISTING WITH SAFE DRIVING, STORAGE MEDIUM UPON WHICH THE COMPUTER PROGRAM IS STORED, AND NAVIGATION DEVICE

(75) Inventors: Yumiko Yamashita, Nagoya (JP); Shintaro Ohsaki, Nagoya (JP)

(73) Assignee: Toyota Mapmaster Incorporated, Nagoya-shi, Aichi (JP)

( * ) Notice: Subject to any disclaimer, the term of this patent is extended or adjusted under 35 U.S.C. 154(b) by 121 days.

(21) Appl. No.: 13/063,161

(22) PCT Filed: Nov. 18, 2009

(86) PCT No.: PCT/JP2009/006202
§ 371 (c)(1),
(2), (4) Date: Mar. 9, 2011

(87) PCT Pub. No.: WO2010/058573
PCT Pub. Date: May 27, 2010

(65) Prior Publication Data
US 2011/0215951 A1    Sep. 8, 2011

(30) Foreign Application Priority Data
Nov. 21, 2008  (JP) .................................. 2008-298592

(51) Int. Cl.
*G08G 1/123*      (2006.01)
(52) U.S. Cl.
USPC ... 340/995.19; 340/988; 340/990; 340/995.1; 701/455
(58) Field of Classification Search
USPC ............ 340/988–993, 995.1, 995.12–995.14, 340/995.19, 539.2; 701/455, 415, 207–209, 701/213
See application file for complete search history.

(56) References Cited

U.S. PATENT DOCUMENTS 5,808,598 A * 9/1998 Nakatani et al. .............. 715/784
6,472,977 B1   10/2002 Pochmuller
(Continued)

FOREIGN PATENT DOCUMENTS

| EP | 1233389 | 8/2002 |
|----|---------|--------|
| EP | 1659029 | 5/2006 |

(Continued)

OTHER PUBLICATIONS

Supplementary European Search Report, dated Jul. 17, 2012, EP Application No. 09827354.3.

*Primary Examiner* — Anh V La
(74) *Attorney, Agent, or Firm* — Quarles & Brady LLP; Gavin J. Milczarek-Desai (57) ABSTRACT

Disclosed is a system and method that offer improved assistance with safe driving using navigation devices, incorporating traffic regulations pertaining to route changes into guidance offered by the navigation devices. The system comprises a traffic regulations data memory (21), which associates, with roadways, data on traffic regulations pertaining to route changes, and stores the data so associated, an onboard vehicle locator (11), which locates the driver's vehicle upon the suggested route, a comparison unit (31), which compares the location of the driver's vehicle, as located by the onboard vehicle locator (11), with the traffic regulations data, and an output unit (40), which outputs, based on the determination made by the comparison unit (31), either information that driving regulations apply upon the road currently being traveled, as part of the suggested route, or that driving regulations apply upon roads ahead of the road currently being traveled, again, as part of the suggested route.

18 Claims, 6 Drawing Sheets

U.S. PATENT DOCUMENTS

7,680,589 B2 * 3/2010 Yamada .................. 701/415
2002/0188400 A1 * 12/2002 Sato et al. ................ 701/212

FOREIGN PATENT DOCUMENTS

| | | |
|---|---|---|
| JP | 62-154098 A | 7/1987 |
| JP | 7-063567 A | 3/1995 |
| JP | 2000-46574 A | 2/2000 |
| JP | 2000-180193 A | 6/2000 |
| JP | 2006-11656 A | 1/2006 |
| JP | 2006011656 | 1/2006 |
| JP | 2006-084384 A | 3/2006 |
| JP | 2006079356 | 3/2006 |
| JP | 2007127598 | 7/2007 |
| WO | WO2008002126 | 1/2008 |

* cited by examiner

SYSTEM AND METHOD FOR ASSISTING WITH SAFE DRIVING, COMPUTER PROGRAM FOR ASSISTING WITH SAFE DRIVING, STORAGE MEDIUM UPON WHICH THE COMPUTER PROGRAM IS STORED, AND NAVIGATION DEVICE

TECHNICAL FIELD

The present invention relates, in general, to safe driving support systems and methods. More particularly, the present invention relates to a system and a method for supporting safe driving on a road to which traffic regulations relating to lane changing are applied.

BACKGROUND ART

Figure 1:
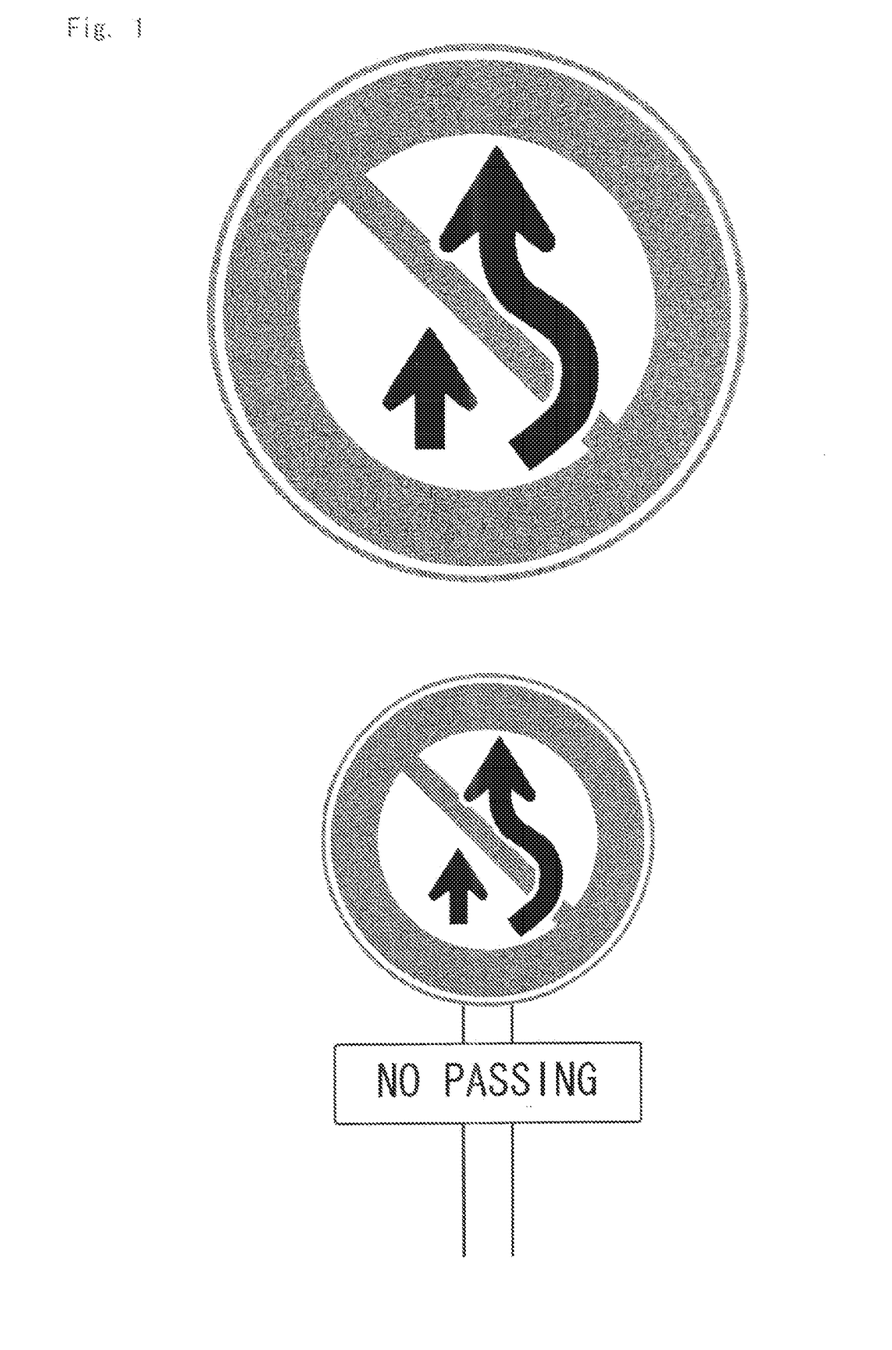
FIG. 1 is an illustration showing signs of a traffic regulation relating to lane changing (no passing on the right for overtaking and no passing).

Traffic regulations relating to lane changing include, for example, "no passing", "no passing on the right for overtaking" (see FIG. 1), and "no lane changing".

The traffic regulation of "no passing" is very often set in a section of one lane on each side of two-way traffic, when there is a predetermined volume of traffic, or when visibility is poor due to, for example, a curved road.

Similarly, the traffic regulation of "no lane changing" is very often set particularly when lane changing is expected to entail hazards, such as "a place near a corner of a road", "a place near the top of an uphill", "a steep slope", "a sag", and "a tunnel".

Patent Document 1 may be referred to as a document that discloses a technique relating to the present invention.

Similar traffic regulations are adopted also in a number of foreign countries (FIG. 6). FIGS. 6(A), 6(B), and 6(C) show signs representing no passing in the U.S., France, and the UK, respectively. FIGS. 6(D) and 6(E) show signs representing no passing in Germany.

Patent Document 1: Japanese Patent Application Publication No. JP-A-7-63567

DISCLOSURE OF THE INVENTION

Problems to be Solved by the Invention

A navigation system in related art has not utilized traffic regulations relating to lane changing for guidance thereof.

It is a first object of the present invention to even further enhance safe driving support through a navigation system by using traffic regulations relating to lane changing for guidance of the navigation system.

The traffic regulations described above are very often set continuously over a relatively long section. During running on the section, the driver of a vehicle is under stress if there is a vehicle running at a considerably lower speed than a regulatory speed, such as a large-sized trailer loaded with a heavy machine, ahead of the host vehicle because the driver is not allowed to pass or change lanes against the driver's wish to drive smoothly. This may lead to a violation of traffic regulations by trying unreasonably hard to pass or changing lanes, thus impairing safe driving.

It is therefore a second object of the present invention to reduce stress imposed on the driver if a guided route includes a road to which a traffic regulation relating to lane changing is applied.

Means for Solving the Problem

A first aspect of the present invention achieves the first object and is defined as follows.

A safe driving support system characterized by including:
a first memory that stores traffic regulation data on a traffic regulation relating to lane changing in association with a road;
a host vehicle position identifying device that identifies a position of a host vehicle on a guided route;
a comparing device that compares the position of the host vehicle identified by the host vehicle position identifying device with the traffic regulation data; and
an output device that produces, based on a result produced by the comparing device, an output to the effect that the traffic regulation is applied to a road on which the vehicle is travelling on the guided route or a road ahead of the road on which the vehicle is travelling on the guided route.

According to the first aspect of the present invention as defined above, guidance can be given to a driver at an appropriate timing on the presence of a road to which the traffic regulation relating to lane changing is applied.

A second aspect of the present invention is defined as follows.

The safe driving support system as defined by the first aspect of the present invention further includes a speed comparing device that compares a speed of the host vehicle with a predetermined first threshold speed, in which the output device is operated when the speed of the host vehicle is lower than the first threshold speed.

According to the second aspect of the present invention as defined above, when the speed of the host vehicle is lower than the predetermined threshold speed, the speed of the host vehicle tends to be lower as affected by a preceding vehicle. In this case, desirably, the driver is notified of the presence of a traffic regulation in order to prevent the driver from trying unreasonably hard to pass. If, on the other hand, the speed of the host vehicle is higher than the predetermined threshold speed, the driver feels no stress at all, so that there is no need to give guidance on the traffic regulation.

A third aspect of the present invention is defined as follows.

The safe driving support system as defined by the first or second aspect of the present invention further includes a forward vehicle recognizing device that recognizes a vehicle running ahead, in which
the output device is operated when the vehicle recognizing device recognizes a vehicle that runs ahead.

According to the third aspect of the present invention as defined above, the driver is notified of the presence of a traffic regulation when a vehicle that runs ahead is recognized, so that an unreasonable passing attempt can be prevented. In other words, when there are no vehicles running ahead, the driver feels no stress at all, so that there is no need to give guidance on the traffic regulation.

A fourth aspect of the present invention is defined as follows.

The safe driving support system as defined by the first to third aspects of the present invention further includes a device that guides, based on a result produced by the comparing device, another route excluding part or the entirety of the road to which the traffic regulation is applied.

According to the fourth aspect of the present invention as defined above, route guidance is given so that the road to which the traffic regulation relating to lane changing is applied is to be avoided at an appropriate timing. The driver who is under stress because of the traffic regulation can therefore select another route so as to be relieved of the stress.

The reason for "excluding part of the road to which the traffic regulation is applied" is that, if the road to which the traffic regulation is applied extends over a long distance along a substantially straight line, the vehicle ahead can turn off the traffic regulated road to run onto a side road. A traffic regulated road continuously extending from the current position over a predetermined distance is therefore excluded from a search route candidate. In other words, if the remaining distance of the traffic regulated road is shorter than the predetermined distance, the entirety of the traffic regulated road is excluded.

A fifth aspect of the present invention is defined as follows.

The safe driving support system as defined by first to third aspects of the present invention further includes a direction change recognizing device that recognizes a change in a running direction for a passing attempt made by the host vehicle, in which when the direction change recognizing device recognizes a change in the running direction made by the host vehicle and the traffic regulation is applied to the road on which the host vehicle is travelling, the output device produces an output to the effect that the traffic regulation is applied to the road on which the vehicle is travelling.

According to the fifth aspect of the present invention as defined above, when the host vehicle starts changing lanes for a passing attempt as recognized by the direction change recognizing device, the driver is notified that the traffic regulation is applied to the road on which the vehicle is travelling. Violation of a traffic regulation, such as an unreasonable passing attempt, can thereby be prevented.

The direction change recognizing device may, for example, be a turn signal lever and a steering wheel. Patterns of operations performed during lane changing are previously stored. When an operation corresponding to any of these operating patterns is performed, it is determined that illegal driving such as passing is performed, so that the driver is notified of the presence of a traffic regulation to ensure safe driving. The operating patterns previously stored, involving an operation of a turn signal lever or a steering wheel, may be combined with an abrupt change in acceleration (or a pedal operation amount) that develops during an unreasonable passing attempt.

A sixth aspect of the present invention is defined as follows.

In the safe driving support system as defined by any of the first to third aspects of the present invention, when the traffic regulation is applied to a road ahead of the road on which the host vehicle is travelling on the guided route, the output device is operated and produces an output of a distance from the current position to the road to which the traffic regulation is applied and/or a reaching time.

According to the sixth aspect of the present invention as defined above, the driver is notified of the time required for reaching a point at which the traffic regulation is started on the guided route and/or the distance to reach the point, so that the driver can take an appropriate action. For example, the driver can pass or take another action before the traffic regulation is started, or select another route.

A seventh aspect of the present invention is defined as follows. In the safe driving support system as defined by any of the first to third aspects of the present invention, when the traffic regulation is applied to the road on which the host vehicle is travelling on the guided route, the output device is operated and produces an output of a distance from the current position to the end of the road to which the traffic regulation is applied and/or a reaching time.

According to the seventh aspect of the present invention as defined above, the driver is notified of time after which the traffic regulation is to be lifted on the route on which the vehicle is following and/or a distance after which the traffic regulation is to be lifted.

The driver can thereby have a rough idea of how long the driver has to endure, which helps the driver reduce stress.

An eighth aspect of the present invention is defined as follows.

A safe driving support method using a navigation system including a first memory that stores traffic regulation data on a traffic regulation relating to lane changing in association with a road, and a host vehicle position identifying device that identifies a position of a host vehicle on a guided route, the method including:

comparing the position of the host vehicle identified by the host vehicle position identifying device with the traffic regulation data; and producing, based on a result of the comparing, an output to the effect that the traffic regulation is applied to a road on which the vehicle is travelling on the guided route or a road ahead of the road on which the vehicle is travelling on the guided route.

In the safe driving support method according to the eighth aspect of the present invention as defined above, guidance can be given to the driver at an appropriate timing on the presence of a road to which the traffic regulation relating to lane changing is applied.

A ninth aspect of the present invention is defined as follows.

The safe driving support method as defined by the eighth aspect of the present invention further includes comparing a speed of the host vehicle with a predetermined first threshold speed, in which the producing of an output is performed when the speed of the host vehicle is lower than the first threshold speed.

The safe driving support method according to the ninth aspect of the present invention as defined above can achieve the same effect as that of the second aspect of the present invention.

A tenth aspect of the present invention is defined as follows.

The safe driving support method as defined by the eighth or ninth aspect of the present invention further includes recognizing a vehicle running ahead, in which the producing of an output is performed when a vehicle that runs ahead is recognized in the recognizing of a vehicle.

The safe driving support method according to the tenth aspect of the present invention as defined above can achieve the same effect as that of the third aspect of the present invention.

An eleventh aspect of the present invention is defined as follows.

In the safe driving support method as defined by any of the eighth to tenth aspects of the present invention, based on a result of the comparing, a guidance of another route excluding part or the entirety of the road to which the traffic regulation is applied is given.

The eleventh aspect of the present invention as defined above can achieve the same effect as that of the fourth aspect of the present invention.

A twelfth aspect of the present invention is defined as follows.

The safe driving support method as defined by any of the eighth to tenth aspects of the present invention further includes recognizing a change in a running direction for a passing attempt made by the host vehicle, in which when a change in the running direction made by the host vehicle is recognized in the recognizing of a change in the direction and the traffic regulation is applied to the road on which the host vehicle is travelling, the output device produces an output to the effect that the traffic regulation is applied to the road on which the vehicle is travelling.

The twelfth aspect of the present invention as defined above can achieve the same effect as that of the fifth aspect of the present invention.

A thirteenth aspect of the present invention is defined as follows.

In the safe driving support method as defined by any of the eighth to tenth aspects of the present invention, when the traffic regulation is applied to a road ahead of the road on which the host vehicle is travelling on the guided route, the producing of an output is performed and an output is produced of a distance from the current position to the road to which the traffic regulation is applied and/or a reaching time.

The thirteenth aspect of the present invention as defined above can achieve the same effect as that of the sixth aspect of the present invention.

A fourteenth aspect of the present invention is defined as follows.

In the safe driving support method as defined by any of the eighth to tenth aspects of the present invention, when the traffic regulation is applied to the road on which the host vehicle is travelling on the guided route, the producing of an output is performed and an output is produced of a distance from the current position to the end of the road to which the traffic regulation is applied and/or a reaching time.

The fourteenth aspect of the present invention as defined above can achieve the same effect as that of the seventh aspect of the present invention.

The present invention may also be perceived as a technical idea embodied in the form of a computer program or a recording medium thereof.

Further, the safe driving support systems may be incorporated into a navigation system.

DESCRIPTION OF THE REFERENCE NUMERALS 1 safe driving support system
10 input section
11 host vehicle position identifying section
13 speed identifying section
15 camera
17 direction change instructing section
20 memory section
21 traffic regulation data memory (first memory)
30 arithmetic operation section
31 comparing section
35 speed comparing section
37 vehicle recognizing section
39 direction change recognizing section
40 output section
41 guidance selecting section
43 route re-searching section
45 display

BEST MODES FOR CARRYING OUT THE INVENTION

An embodiment of the present invention will be described below.

Figure 2:
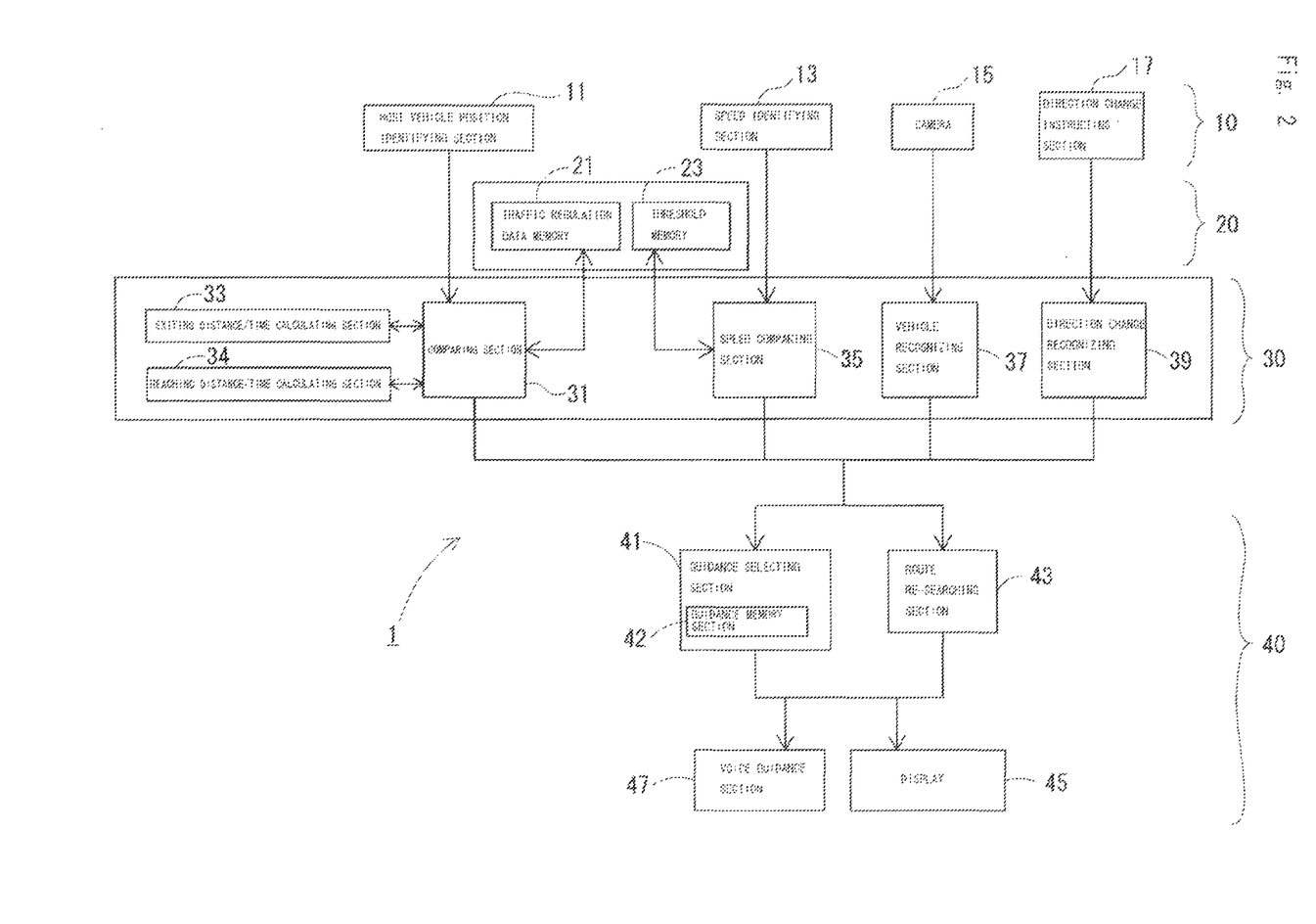
FIG. 2 is a block diagram showing an arrangement of a safe driving support system according to an embodiment of the present invention.

FIG. 2 is a functional block diagram showing a safe driving support system 1 according to the embodiment of the present invention.

The safe driving support system 1 includes an input section 10, a memory section 20, an arithmetic operation section 30, and an output section 40.

The input section 10 includes a host vehicle position identifying section 11, a speed identifying section 13, a camera 15, and a direction change instructing section 17. A global positioning system (GPS) unit or a gyro unit that is generally included in a navigation system may be used for the host vehicle position identifying section 11.

The speed identifying section 13 identifies the current running speed of the host vehicle, for which a speedometer provided as an accessory for the vehicle may be used.

The camera 15 identifies a vehicle forward of the host vehicle, for which a general-purpose onboard camera may be used. An image shot by the camera 15 is processed by a vehicle recognizing section 37 to thereby recognize the vehicle. Instead of the camera 15, a laser beam irradiation unit may be used. To correspond to the laser beam irradiation unit, a laser beam receiving unit, a unit for converting a laser beam received to an electrical signal, and a unit for processing the electrical signal to thereby recognize that a forward obstacle is a vehicle are provided.

The direction change instructing section 17 instructs the host vehicle to change direction. When an instruction to change direction is issued, a direction change signal is output to a direction change recognizing section 39. For the direction change instructing section 17, a turn signal lever or an angle sensor of a steering wheel may be used.

The memory section 20 includes a traffic regulation data memory 21 as a first memory and a threshold memory 23. The traffic regulation data memory 21 stores traffic regulations relating to lane changing (see FIG. 1) in association with roads of guided routes. The threshold memory 23 stores a first threshold speed that is compared with the running speed of the host vehicle.

The arithmetic operation section 30 includes a comparing section 31, an exiting distance/time calculating section 33, a reaching distance/time calculating section 34, a speed comparing section 35, the vehicle recognizing section 37, and the direction change recognizing section 39.

The comparing section 31 compares the position of the host vehicle identified by the host vehicle position identifying section 11 with traffic regulation data stored in the traffic regulation data memory 21 to thereby identify whether or not a traffic regulation is applied to a road on which the vehicle is travelling on the guided route or a road ahead of the road on which the vehicle is travelling on the guided route.

If a traffic regulation is applied to the road on which the vehicle is travelling, the exiting distance/time calculating section 33 calculates a distance to travel from the current position to where the traffic regulation is lifted or time required for traveling the distance.

If a traffic regulation is applied to the road ahead of the road on which the vehicle is travelling, the reaching distance/time calculating section 34 calculates a distance from the current position to where the traffic regulation starts or time required for traveling the distance.

The speed comparing section 35 compares the current speed of the host vehicle identified by the speed identifying section 13 with the first threshold speed stored in the threshold memory 23. If a comparison result shows that the current speed of the host vehicle is lower than the first threshold speed, the speed comparing section 35 outputs a signal to the output section 40 to operate the output section 40. Note that the speed comparing section 35 may, instead, calculate an average speed over a predetermined period of time and compare the average speed with the first threshold speed.

The first threshold speed may be set to any value; for example, the value may be 80% of a speed limit of the road to which the traffic regulation relating to lane changing is applied.

The vehicle recognizing section 37 processes an image sent from the camera 15 oriented forwardly of the vehicle and recognizes a vehicle in the image. When recognizing the vehicle, the vehicle recognizing section 37 outputs a signal to the output section 40 to operate the output section 40.

When recognizing that the direction change instructing section 17 such as a turn signal lever is operated, the direction change recognizing section 39 sends a signal to the output section 40 to operate the output section 40.

Preferably, a comparison between the position of the host vehicle and the road to which the traffic regulation is applied made by the comparing section 31 be performed in the arithmetic operation section 30. However, processing by the speed comparing section 35, the vehicle recognizing section 37, and the direction change recognizing section 39 may be arbitrarily performed.

The output section 40 includes a guidance selecting section 41, a route re-searching section 43, a display 45, and a voice guidance section 47. The guidance selecting section 41 includes a guidance memory section 42 that previously stores guidance contents. The guidance contents are selected according to an output from each element of the arithmetic operation section 30.

Contents to be displayed may, for example, include the following:

(1) No passing on the road on which the vehicle is travelling (2) The vehicle is going to enter no passing road ahead (3) Do you want to search for an alternative roundabout route to bypass the no passing road?

The route re-searching section 43 searches for a route from the current position to a destination by excluding a predetermined section of the road to which the traffic regulation relating to lane changing is applied.

Assume, for example, that a left turn (or a right turn) will be made at a next signalized intersection (or one after several such signalized intersections). In addition, on condition that the vehicle does not return to the road to which the traffic regulation relating to lane changing is applied until reaching a predetermined distance ahead (e.g., 3 km), time required for reaching the destination is calculated and the time is compared with an original time (time required for reaching the destination when the left turn or right turn is not made). If the time through the roundabout route is equal to, or shorter than, the original time, the roundabout route is displayed. If, on the other hand, the time through the roundabout route is longer than the original time, a message indicating to that effect is displayed only.

The display 45 shows guidance selected by the guidance selecting section 41 and the route searched by the route re-searching section 43.

Guidance for, for example, a no passing road may also be audibly given by using the voice guidance section 47, in addition to the display 45.

In the above, functions of the memory section 20, the arithmetic operation section 30, and the output section 40 are performed by a computer of the navigation system. In order for the computer to perform these functions, a computer program is stored in a predetermined memory device (e.g., a hard disc) of the navigation system and used as appropriately by being loaded in a central control unit. The computer program may be stored in a recording medium, such as a DVD.

Some regions of the predetermined memory device (e.g., a hard disc) of the navigation system are used as the memory section 20 and the guidance memory section 42, and contents of the memory section 20 and the guidance memory section 42 are written in the memory in advance.

The navigation system includes typically found elements, including a route calculating unit, a road information memory, an additional information memory, a GPS unit, a gyro unit, a timer, and a voice generating section.

Figure 3:
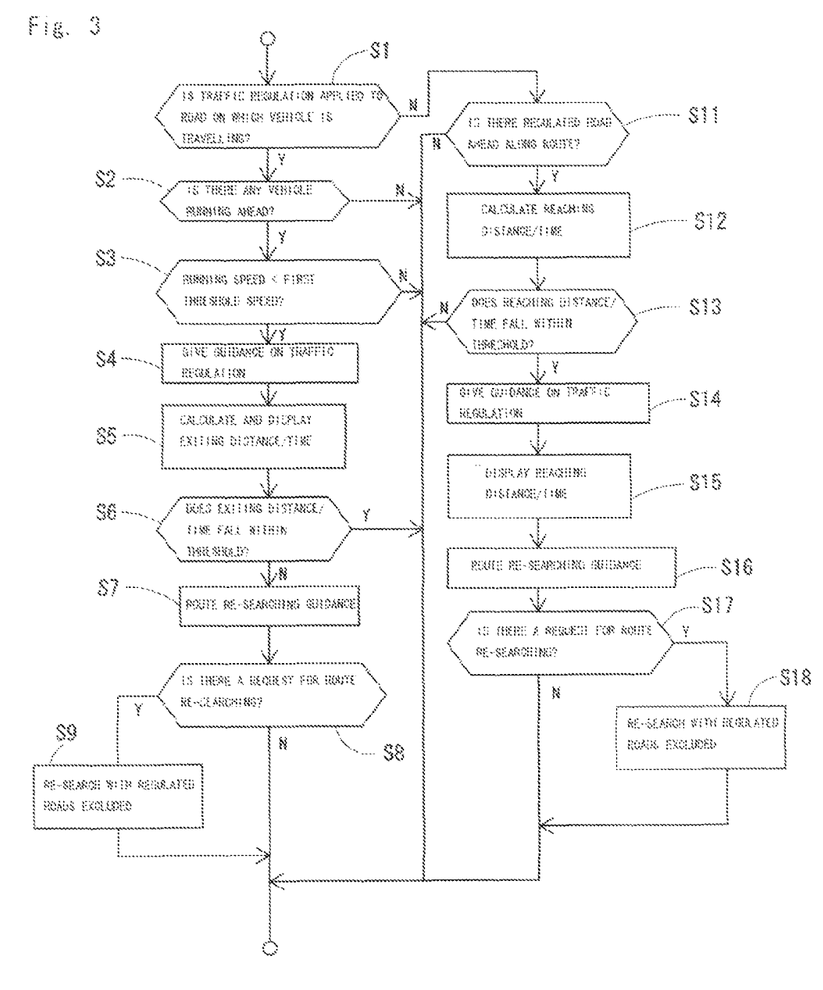
FIG. 3 is a flow chart for illustrating operation of the safe driving support system according to the embodiment of the present invention.

Operation of the safe driving support system 1 according to the embodiment of the present invention will be described below with reference to a flow chart of FIG. 3.

When a driver sets a destination, the navigation system operates to search for a route to the destination. Traffic regulation data associated with the route is read from the road information memory. The traffic regulation data, together with roads included in the route searched, is stored in the traffic regulation data memory 21.

In step 1, the current position of the host vehicle identified by the host vehicle position identifying section 11 is compared with the roads on the route and the traffic regulations thereof stored in the traffic regulation data memory 21. If a comparison result shows that a traffic regulation is applied to the road on which the vehicle is travelling, the operation proceeds to step 2. The traffic regulation, as the term is herein used, refers to the traffic regulation relating to lane changing, such as no passing. In this specification, a road to which such a traffic regulation is applied may be called hereunder a "regulated road".

In step 2, the vehicle recognizing section 37 processes the image from the camera 15 that shoots a forward view of the host vehicle. If the image includes a vehicle, the operation proceeds to step 3.

Figure 4A:
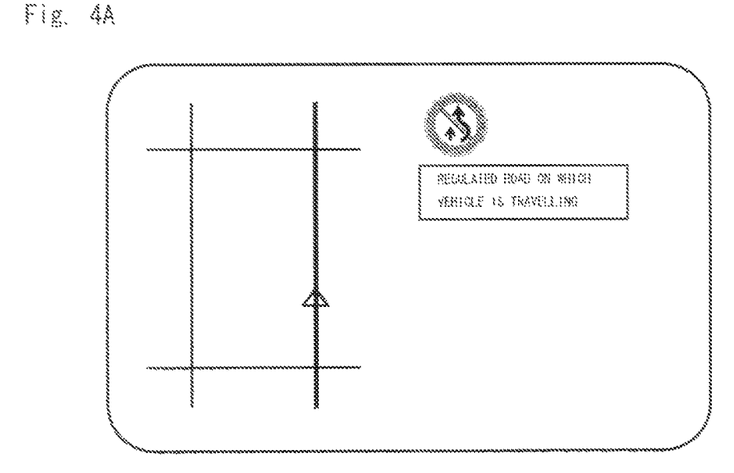
FIG. 4 is an illustration showing an example of a display pattern of a display according to the embodiment of the present invention.

In step 3, the speed comparing section 35 compares the current speed of the host vehicle identified by the speed identifying section 13 with the first threshold speed stored in the threshold memory 23. If the current running speed is lower than the first threshold speed, the operation proceeds to step 4. In step 4, the guidance selecting section 41 selects a guidance content from among those stored in the guidance memory section 42 and, while the guidance content is displayed on the display 45 (see FIG. 4A), the voice guidance section 47 gives guidance that the road on which the vehicle is travelling is a regulated road.

In the above, according to the embodiment of the present invention, the traffic guidance is given only if the determinations in steps 2 and 3 are both YES. Understandably, such determination may be made in either step 2 or step 3, and the traffic guidance may be given if the determination result is YES. Alternatively, determinations may not be performed in both steps.

Further, the operation may proceed to the step 4 when whether or not there is a direction change instruction is determined by using the direction change instructing section 17 and the direction change recognizing section 39 and, if the determinations in steps 2 and 3 are both YES and there is a direction change instruction. Still further, the operation may proceed to step 4, if the determination in step 1 is YES and there is a direction change instruction, or if the determination is made in either step 2 or 3 with step 1 omitted and the determination result is YES, and there is a direction change instruction.

Figure 4B:
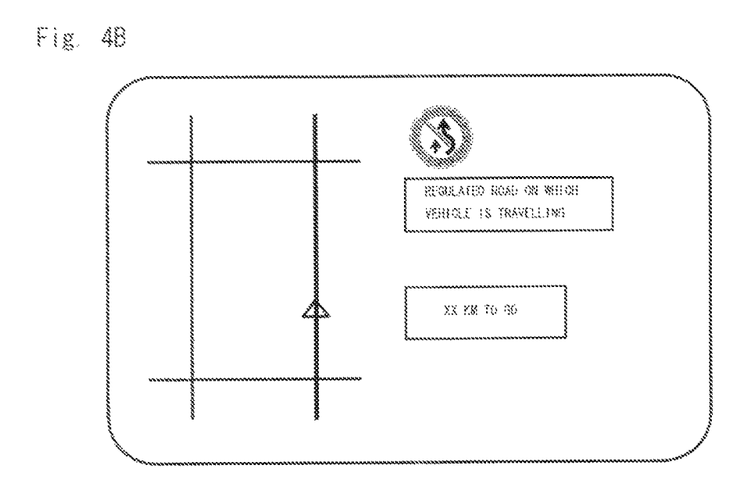

In step 5, as the vehicle runs on the guided route at the current running speed, a distance to travel to exit the regulated road (the distance to travel from the current position to an end point of the regulated road) and/or time to travel to exit the regulated road (the time required for driving past the end point of the regulated road) are calculated. The calculation result is displayed on the display 45 (see FIG. 4B).

In step 6, it is determined whether or not the distance and/or time to travel to exit the regulated road falls within a threshold. Threshold values of 500 m and 3 minutes may be set for the distance (distance from the current position to the end point of the regulated road) and the time (time required for driving past the end point of the regulated road), respectively. In this embodiment, only the distance to travel to exit the regulated road is subject to determination.

If the exiting distance/time exceeds the threshold, the operation proceeds to step 7 and the display 45 shows a screen for requesting to re-search a route excluding the regulated road. When the driver makes a route re-searching request (YES in step 8), the operation proceeds to step 9. The route re-searching section 43 performs re-searching of a route excluding the regulated road for subsequent display on the display 45.

If the determination in step 6 is YES, the vehicle is going to exit the regulated road soon, so that the operation does not proceed to steps 7 and 8 in order to avoid confusing the driver.

Returning to step 1, if no special traffic regulation is applied to the road on which the vehicle is travelling, the operation proceeds to step 11. In step 11, the comparing section 31 scans contents in the traffic regulation data memory 21 to determine whether or not traffic regulations are applied to roads ahead along the guided route. If there is a regulated road ahead on the guided route, the operation proceeds to step 12.

In step 12, a distance to travel to reach the regulated road (the distance to travel from the current position to a start point of the regulated road) and/or (the time required for reaching the start point of the regulated road) are calculated.

If there is a sufficient distance from the current position to the regulated road ahead on the route, there is no need to bother to give guidance on the regulated road. Threshold distance for the distance above (distance from the current position to the start point of the regulated road) may be set to 3000 m, and threshold time for the time above (time required for reaching the start point of the regulated road) may be set to 10 minutes. In this embodiment, only the distance to reach the regulated road is subject to determination.

Figure 5A:
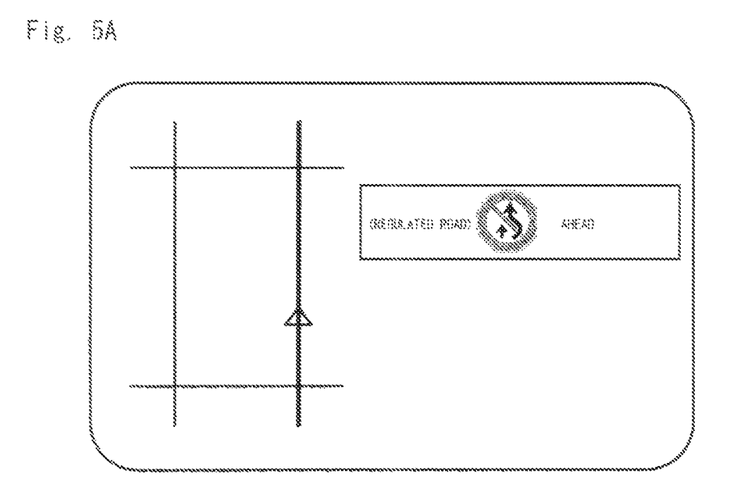
FIG. 5 is an illustration showing another example of the display pattern of the display according to the embodiment of the present invention.

If the reaching distance/time falls within the threshold, the operation proceeds to step 14. In step 14, the guidance selecting section 41 selects a guidance content from among those stored in the guidance memory section 42 and, while the guidance content is displayed on the display 45 (see FIG. 5A), the voice guidance section 47 gives voice guidance.

Figure 5B:
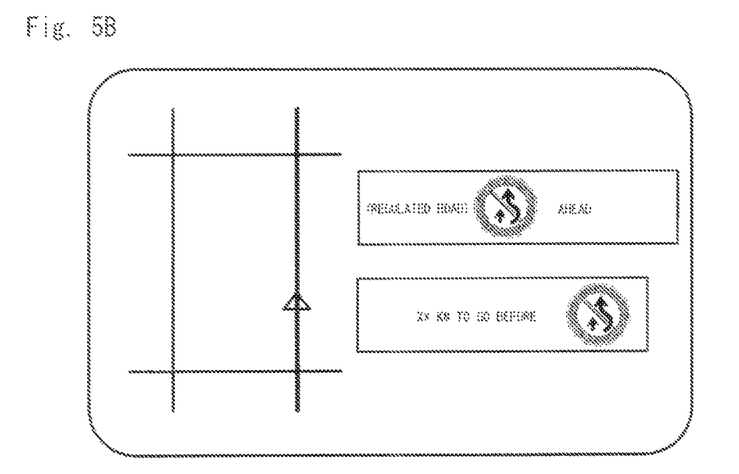
Figure 6A:
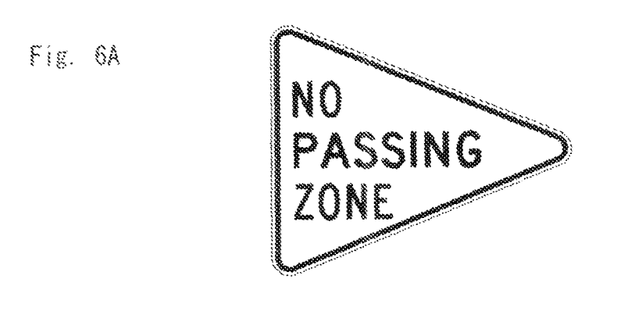
FIG. 6 is an illustration showing signs of traffic regulations relating to lane changing in foreign countries.
Figure 6B:
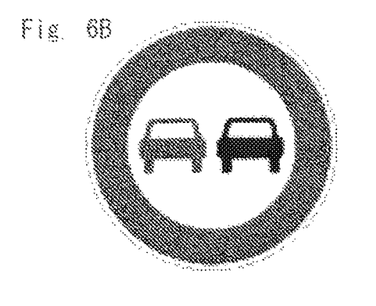
Figure 6C:
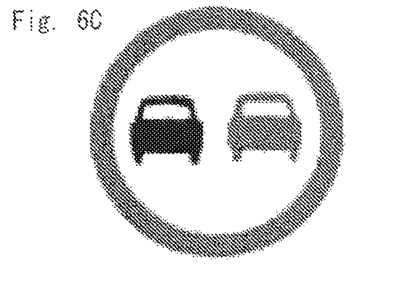
Figure 6D:
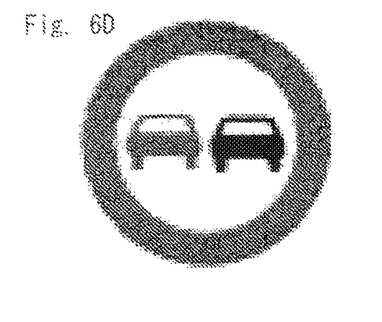
Figure 6E:
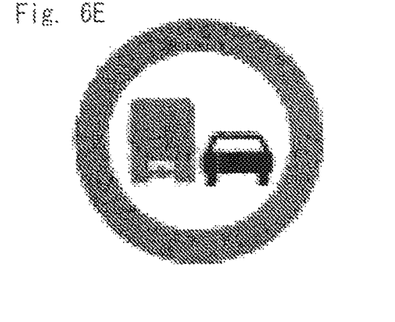

Results of calculation performed in step 12 (reaching distance/time) are displayed on the display 45 in step 15 (see FIG. 5B). Meanwhile, in step 16, the display 45 shows a screen for requesting to re-search a route excluding the regulated road (step 16). When the driver makes a route re-searching request (YES in step 17), the operation proceeds to step 18. The route re-searching section 43 performs re-searching of a route excluding the regulated road, and displays the result on the display 45.

In the above, the operation may proceed to step 11 when the determination in step 2 is NO. Similarly, the operation may proceed to step 11 when the determination in step 3 is NO. Step 2 may still be omitted and the operation may proceed to step 11 when the determination in step 3 is NO.

In the safe driving support system 1 according to the embodiment of the present invention, guidance can be given on the presence of a road to which a traffic regulation relating to lane changing, such as no passing, is applied, so that the driver can be prevented from, for example, trying unreasonably hard to pass.

If the traffic regulation above is applied to the road on which the vehicle is travelling, guidance is given on the distance/time over which the traffic regulation is terminated and a search is allowed for another route that excludes the regulated road. This reduces stress on the driver when there is a vehicle running slowly ahead of the driver.

Similarly, if the traffic regulation is applied to a road ahead on the route, guidance is given on the distance/time to reach the regulated road and a search is allowed for another route that excludes the regulated road. This reduces stress on the driver.

It should be understood that the present invention is not limited to the embodiment of the present invention above and the description of the embodiment. The present invention may also encompass various modifications without departing from the scope of the claims and within a range that those skilled in the art can easily devise.

The invention claimed is:

1. A safe driving support system comprising:
a first memory that stores traffic regulation data on a traffic regulation relating to lane changing in association with a road;
a host vehicle position identifying device that identifies a position of a host vehicle on a guided route;
a comparing device that compares the position of the host vehicle identified by said host vehicle position identifying device with the traffic regulation data;
an output device that produces, based on a result produced by said comparing device, an output to an effect that the traffic regulation is applied to a road on which the vehicle is travelling on the guided route or a road ahead of the road on which the vehicle is travelling on the guided route;
a speed comparing device that compares a speed of the host vehicle with a predetermined first threshold speed; and
a vehicle recognizing device that is provided in the host vehicle and recognizes a vehicle running ahead of the host vehicle, wherein
said output device is operated when the speed of the host vehicle is lower than the first threshold speed and when said vehicle recognizing device recognizes a vehicle that runs ahead of the host vehicle.

2. A safe driving support system according to claim 1, further comprising:
a device that guides, based on a result produced by said comparing device, another route excluding part or entirety of the road to which the traffic regulation is applied.

3. A safe driving support system according to claim 1, further comprising:

a direction change recognizing device that recognizes a change in a running direction for a passing attempt made by the host vehicle, wherein when said direction change recognizing device recognizes a change in the running direction made by the host vehicle and the traffic regulation is applied to the road on which the host vehicle is travelling, said output device produces an output to an effect that the traffic regulation is applied to the road on which the vehicle is travelling.

4. A safe driving support system according to claim 1, wherein that when the traffic regulation is applied to a road ahead of the road on which the host vehicle is travelling on the guided route, said output device is operated and produces an output of a distance from a current position to the road to which the traffic regulation is applied and/or a reaching time.

5. A safe driving support system according to claim 1, wherein that when the traffic regulation is applied to the road on which the host vehicle is travelling on the guided route, said output device is operated and produces an output of a distance from a current position to an end of the road to which the traffic regulation is applied and/or a reaching time.

6. A safe driving support system according to claim 1, wherein that said vehicle recognizing device comprising a camera oriented forwardly of the host vehicle and an image processing section processing an image from the camera and recognizing the vehicle in the image.

7. A safe driving support method using a navigation system including a first memory that stores traffic regulation data on a traffic regulation relating to lane changing in association with a road, and a host vehicle position identifying device that identifies a position of a host vehicle on a guided route, the method comprising:

comparing the position of the host vehicle identified by said host vehicle position identifying device with the traffic regulation data;

producing, based on a result of the comparing, an output to an effect that the traffic regulation is applied to a road on which the vehicle is travelling on the guided route or a road ahead of the road on which the vehicle is travelling on the guided route;

comparing a speed of the host vehicle with a predetermined first threshold speed; and, recognizing a vehicle running ahead of the host vehicle by a vehicle recognizing device provided in the host vehicle, wherein the producing of an output is performed when the speed of the host vehicle is lower than the first threshold speed and when a vehicle that runs ahead of the host vehicle is recognized in the recognizing of a vehicle.

8. A safe driving support method according to claim 7, wherein based on a result of the comparing, a guidance of another route excluding part or entirety of the road to which the traffic regulation is applied is given.

9. A safe driving support method according to claim 7, further comprising:

recognizing a change in a running direction for a passing attempt made by the host vehicle, wherein when a change in the running direction made by the host vehicle is recognized in the recognizing of a change in the direction and the traffic regulation is applied to the road on which the host vehicle is travelling, said output device produces an output to an effect that the traffic regulation is applied to the road on which the vehicle is travelling.

10. A safe driving support method according to claim 7, wherein when the traffic regulation is applied to a road ahead of the road on which the host vehicle is travelling on the guided route, the producing of an output is performed and an output is produced of a distance from a current position to the road to which the traffic regulation is applied and/or a reaching time.

11. A safe driving support method according to claim 7, wherein when the traffic regulation is applied to the road on which the host vehicle is travelling on the guided route, the producing of an output is performed and an output is produced of a distance from a current position to an end of the road to which the traffic regulation is applied and/or a reaching time.

12. A safe driving support method according to claim 7, wherein that said recognizing a vehicle comprising shooting an image by a camera oriented forwardly of the host vehicle, processing the image and recognizing the vehicle in the image.

13. A computer readable medium that contains programming for causing a computer system to function as:

a first memory that stores traffic regulation data on a traffic regulation relating to lane changing in association with a road;

a host vehicle position identifying device that identifies a position of a host vehicle on a guided route;

a comparing device that compares the position of the host vehicle identified by said host vehicle position identifying device with the traffic regulation data;

an output device that produces, based on a result produced by said comparing device, an output to an effect that the traffic regulation is applied to a road on which the vehicle is travelling on the guided route or a road ahead of the road on which the vehicle is travelling on the guided route;

a speed comparing device that compares a speed of the host vehicle with a predetermined first threshold speed; and a vehicle recognizing device that is provided in the host vehicle and recognizes a vehicle running ahead of the host vehicle, wherein said output device is operated when the speed of the host vehicle is lower than the first threshold speed and when said vehicle recognizing device recognizes a vehicle that runs ahead of the host vehicle.

14. A computer readable medium that contains the programming according to claim 13, further causing the computer system to function as:

a device that guides, based on a result produced by said comparing device, another route excluding the road to which the traffic regulation is applied.

15. A computer readable medium that contains the programming according to claim 13, further causing the computer system to function as:

a direction change recognizing device for recognizing a change in a running direction for a passing attempt made by the host vehicle, wherein when said direction change recognizing device recognizes a change in the running direction made by the host vehicle and the traffic regulation is applied to the road on which the host vehicle is travelling, said output device produces an output to an effect that the traffic regulation is applied to the road on which the vehicle is travelling.

16. A computer readable medium that contains the programming according to claim 13, wherein the computer system causes, when the traffic regulation is applied to a road ahead of the road on which the host vehicle is travelling on the guided route, said output device to be operated and produce an output of a distance from a current position to the road to which the traffic regulation is applied and/or a reaching time.

17. A computer readable medium that contains the programming according to claim 13, wherein the computer system causes, when the traffic regulation is applied to the road on which the host vehicle is travelling on the guided route, said output device to be operated and produce an output of a distance from a current position to an end of the road to which the traffic regulation is applied and/or a reaching time.

18. A computer readable medium that contains the programming according to claim 13, wherein that said vehicle recognizing device comprising a shooting device oriented forwardly of the host vehicle and an image processing device processing an image from the shooting device and recognizing the vehicle in the image.

\* \* \* \* \*